(12) United States Patent
Torres et al.

(10) Patent No.: US 12,359,409 B2
(45) Date of Patent: Jul. 15, 2025

(54) ANTI-SCALD DEVICE WITH SHAPE MEMORY SPRING

(71) Applicant: AS America, Inc., Piscataway, NJ (US)

(72) Inventors: Karl Torres, Columbus, NJ (US); Xiao Jing Ye, Edison, NJ (US)

(73) Assignee: AS America, Inc., Piscataway, NJ (US)

( * ) Notice: Subject to any disclaimer, the term of this patent is extended or adjusted under 35 U.S.C. 154(b) by 297 days.

(21) Appl. No.: 18/076,153

(22) Filed: Dec. 6, 2022

(65) Prior Publication Data

US 2023/0183953 A1 Jun. 15, 2023

Related U.S. Application Data (60) Provisional application No. 63/288,921, filed on Dec. 13, 2021.

(51) Int. Cl.
| | |
|---|---|
| *E03C 1/04* | (2006.01) |
| *E03C 1/02* | (2006.01) |
| *F16K 31/00* | (2006.01) |

(52) U.S. Cl.
CPC ............ *E03C 1/041* (2013.01); *F16K 31/002* (2013.01); *E03C 2001/026* (2013.01)

(58) Field of Classification Search
CPC ...... E03C 1/04; E03C 1/041; E03C 2001/026; F16K 19/006; F16K 31/002
See application file for complete search history.

(56) References Cited

U.S. PATENT DOCUMENTS

| | | | |
|---|---|---|---|
| 5,161,737 A | 11/1992 | Olmsted | |
| 5,341,987 A | 8/1994 | Ackroyd | |
| 5,878,949 A * | 3/1999 | Matsui | ..................... E03C 1/041 |
| | | | 236/93 R |
| 8,522,814 B2 * | 9/2013 | Kempf | ..................... E03B 7/045 |
| | | | 236/12.1 |

(Continued)

FOREIGN PATENT DOCUMENTS

| | | |
|---|---|---|
| CA | 2690361 A1 | 7/2011 |
| CN | 101035954 A | 9/2007 |

(Continued)

OTHER PUBLICATIONS

Ye, Office Action dated Sep. 19, 2024, directed to U.S. Appl. No. 18/076,156; 11 pages.

*Primary Examiner* — Henry T Crenshaw
(74) *Attorney, Agent, or Firm* — Morrison & Foerster LLP (57) ABSTRACT

Provided are anti-scald devices and faucet assemblies comprising anti-scald devices. An anti-scald device can include a housing having a cylindrical interior space comprising a first cavity, a second cavity, a mixing chamber, a hot water inlet, and a cold water inlet, a plunger provided within the cylindrical interior space and comprising a cylindrical protrusion portion that separates the first cavity from the second cavity, a counter spring in the first cavity, and a shape memory alloy (SMA) spring in the second cavity, wherein the anti-scald device is in an inactive configuration when the temperature of the mixed water is below a threshold temperature, and when the mixed water reaches or exceeds a threshold temperature and comes in contact with the SMA spring, the SMA spring is configured to expand to reduce or restrict hot water flow such that the anti-scald is in a fully active configuration.

20 Claims, 7 Drawing Sheets

(56) References Cited

U.S. PATENT DOCUMENTS

| | | | |
|---|---|---|---|
| 11,573,581 B2 | 2/2023 | Wilson | |
| 2007/0012792 A1* | 1/2007 | Iwai | G05D 23/1353 236/12.11 |
| 2007/0075152 A1* | 4/2007 | Guterman | G05D 23/022 236/93 R |
| 2007/0290058 A1* | 12/2007 | Guterman | G05D 23/022 236/93 R |
| 2009/0007975 A1 | 1/2009 | Lum | |
| 2010/0314457 A1* | 12/2010 | Todaka | F16K 19/006 236/12.16 |
| 2011/0168927 A1 | 7/2011 | Yuan | |
| 2013/0220439 A1* | 8/2013 | Pitsch | E03C 1/0401 137/15.08 |
| 2013/0248005 A1* | 9/2013 | Pitsch | E03C 1/04 137/315.12 |
| 2017/0145670 A1* | 5/2017 | Leinen | F16K 11/0787 |
| 2017/0252755 A1* | 9/2017 | Pitsch | B05B 1/169 |
| 2017/0328041 A1 | 11/2017 | Seggio et al. | |
| 2018/0245320 A1* | 8/2018 | Pitsch | E03C 1/04 |
| 2021/0191432 A1 | 6/2021 | Wilson | |
| 2023/0183954 A1 | 6/2023 | Ye | |
| 2024/0209603 A1 | 6/2024 | Li | |

FOREIGN PATENT DOCUMENTS

| | | |
|---|---|---|
| CN | 101178128 B | 12/2010 |
| EP | 1376292 B1 | 12/2005 |
| EP | 2354880 A1 | 8/2011 |
| FR | 3044782 A1 | 6/2017 |
| WO | 2004/027295 A2 | 4/2004 |

\* cited by examiner

ABSTRACT ANTI-SCALD DEVICE WITH SHAPE MEMORY SPRING

CROSS-REFERENCE TO RELATED APPLICATIONS

This application claims the benefit of U.S. Provisional Application No. 63/288,921, filed Dec. 13, 2021, the entire contents of which is incorporated herein by reference.

FIELD

The present disclosure generally relates to faucet assemblies, and more particularly, to faucet assemblies having anti-scald devices.

BACKGROUND

Conventional faucet assemblies do not have any control for preventing unsafe hot water temperatures being delivered to a user of the faucet assembly. Thus, a user of a conventional faucet assembly may, when manipulating a temperature control of the faucet assembly (e.g., a handle or knob) to receive hot water, may receive excessively hot water. Excessively hot water can cause a scald injury to the user.

Accordingly, anti-scald devices may be connected to a conventional faucet to control the maximum temperature of the water flowing out of and to the user. Anti-scald devices are generally after-market devices that can connect to a faucet assembly and can reduce or stop the flow of water when the mixed water temperature exceed a certain threshold. For example, it may be desired for plumbing fixtures that are used predominantly by children or elderly people to have an anti-scald device to prevent injuries. A user can install an anti-scald device to control the water temperature of their faucet assembly.

SUMMARY

Provided herein are faucet assemblies having anti-scald devices. The anti-scald devices of the faucet assemblies described include a shape memory alloy, having both superelastic and shape memory characteristics. Specifically, the anti-scald devices described include a spring made of a shape memory alloy that is sensitive to temperature. The shape memory alloy spring is located within a cavity of the anti-scald device that is configured to receive mixed water from a mixing chamber. The shape memory alloy spring is controlled by the temperature of the mixed water, which comes in direct contact with the shape memory alloy spring when the mixed water flows from the mixing chamber to the cavity of the anti-scald device in which the shape memory alloy spring is located. From this cavity, the mixed water flows to a faucet body, and out of a faucet opening of the faucet assembly.

In addition to the shape memory alloy spring, the anti-scald device of the faucet assembly also includes a plunger and a counter spring. The shape memory alloy spring and the counter spring are located on opposite sides of the head of the plunger. The shape memory alloy spring is configured to expand when exposed to mixed water having a temperature at or above a threshold temperature, causing the counter spring to compress such that the plunger moves toward the counter spring and toward the hot water inlet opening. Conversely, when the temperature of the mixed water within the mixing chamber is below the threshold temperature, the force of the counter spring presses against the plunger, causing the shape memory alloy spring to contract.

The shape memory alloy spring can be in an open (inactive) position, a closed (active) position, or anywhere in between its open and closed positions. When the temperature of mixed water in the mixing chamber is below a certain threshold, the shape memory alloy spring is in an open position, meaning the hot water inlet is completely open and hot water flow into the device is unrestricted. However, when the temperature of the mixed water within the mixing chamber reaches or exceeds the threshold temperature, the shape memory alloy spring expands, causing a plunger to partially or fully close off water flow through the hot water inlet. When the hot water inlet is completely closed, the shape memory alloy spring is in its closed position.

When the hot water inlet flow is reduced or stopped (i.e., the shape memory spring is not in its open position, but in its closed position or somewhere therebetween), cold water primarily flows into the device (and contacts the shape memory alloy spring). Because the large majority (if not, all) of the water flowing into the device is cold water, this causes the mixed water temperature to decrease below the threshold temperature. When the temperature of the mixed water drops below the threshold temperature, the shape memory alloy spring relaxes, and a counter spring (compressed when the shape memory allow spring expands) causes the plunger to move such that the hot water inlet waterway is reopened, and the shape memory alloy spring returns to its original, open position.

Accordingly, the faucet assemblies provided herein include a spring system that includes a shape memory alloy spring configured to respond to the mixed water temperatures that are at or above a threshold temperature. In some embodiments, the threshold temperature of the faucet assembly is a temperature at which scalding injuries may begin to occur. Thus, the anti-scald device of the faucet assemblies described herein is designed to maintain a dispensed water temperature (i.e., water that is dispensed from the faucet assembly) below the threshold temperature to prevent scalding injuries.

In some embodiments, provided is an anti-scald device for a faucet assembly, the anti-scald device comprising: a housing having a cylindrical interior space comprising a first cavity, a second cavity, a mixing chamber, a hot water inlet, and a cold water inlet; a plunger provided within the cylindrical interior space of the housing and comprising a first shaft portion and a cylindrical protrusion portion, wherein an outer cylindrical surface of the cylindrical protrusion portion is in contact with an interior surface of the housing, and the cylindrical protrusion portion separates the first cavity from the second cavity of the housing; a counter spring provided within the first cavity and coiled around the first shaft portion of the plunger; and a shape memory alloy (SMA) spring provided within the second cavity, wherein the mixing chamber is configured to receive hot water from the hot water inlet and cold water from the cold water inlet to form mixed water, and the second cavity is configured to receive the mixed water from the mixing chamber, and wherein the anti-scald device is in an inactive configuration when the temperature of the mixed water is below a threshold temperature, and when the mixed water reaches or exceeds a threshold temperature and comes in contact with the SMA spring, the SMA spring is configured to expand, causing the plunger to move laterally within the housing to compress the counter spring and reduce or restrict hot water flow into the mixing chamber such that the anti-scald is in a partially active or a fully active configuration.

In some embodiments of the anti-scald device, the SMA spring comprises nitinol.

In some embodiments of the anti-scald device, the threshold temperature is 115-125° F.

In some embodiments of the anti-scald device, when the anti-scald device is in the inactive configuration, the SMA spring is fully compressed and the counter spring is fully expanded.

In some embodiments of the anti-scald device, the first shaft portion of the plunger comprises a proximal end adjacent to the cylindrical protrusion portion and a distal end, and when the anti-scald device transitions from the inactive configuration to the fully active configuration, the plunger moves laterally such that an outer surface of the distal end of the first shaft portion of the plunger comes in contact with an interior surface of the hot water inlet.

In some embodiments of the anti-scald device, when the anti-scald device is in the fully active configuration, an outer surface of the cylindrical circumferential portion of the plunger covers an opening of a waterway fluidly connecting the hot water inlet and the mixing chamber, preventing flow of hot water through the opening.

In some embodiments of the anti-scald device, when the anti-scald device transitions from the fully active configuration to the inactive configuration due to the temperature of the mixed water decreasing below the threshold temperature, the counter spring returns to its expanded configuration.

In some embodiments of the anti-scald device, the anti-scald device comprises an outlet configured to receive mixed water from the second cavity, wherein a flow path of the outlet is perpendicular to a direction of lateral movement of the plunger.

In some embodiments of the anti-scald device, an outer diameter of the counter spring is less than an outer diameter of the SMA spring.

In some embodiments of the anti-scald device, the mixing chamber is formed by the housing and a cover plate.

In some embodiments of the anti-scald device, the hot water inlet comprises an adaptor coupled to the housing.

In some embodiments, a faucet assembly comprising an anti-scald device is provided, the centerset faucet assembly comprising: a faucet body; two handle members, a first handle member configured to control flow of hot water from a hot water source to the faucet body and a second handle member configured to control flow of cold water from a cold water source to the faucet body; and an anti-scald device fluidly coupled to each of the two handle members and the faucet body, the anti-scald device comprising: a housing having a cylindrical interior space comprising a first cavity, a second cavity, a mixing chamber, a hot water inlet in fluid communication with the first handle member, and a cold water inlet in fluid communication with the second handle member; a plunger provided within the cylindrical interior space of the housing and comprising a first shaft portion and a cylindrical protrusion portion, wherein an outer cylindrical surface of the cylindrical protrusion portion is in contact with an interior surface of the housing, and the cylindrical protrusion portion separates the first cavity from the second cavity of the housing; a counter spring provided within the first cavity and coiled around the first shaft portion of the plunger; and a shape memory alloy (SMA) spring provided within the second cavity, wherein the mixing chamber is configured to receive hot water from the hot water inlet and cold water from the cold water inlet to form mixed water, and the second cavity is configured to receive the mixed water from the mixing chamber, and wherein the anti-scald device is in an inactive configuration when the temperature of the mixed water is below a threshold temperature, and when the mixed water reaches or exceeds a threshold temperature and comes in contact with the SMA spring, the SMA spring is configured to expand, causing the plunger to move laterally within the housing to compress the counter spring and reduce or restrict hot water flow into the mixing chamber such that the anti-scald is in a partially active or a fully active configuration.

In some embodiments of the faucet assembly, the SMA spring comprises nitinol.

In some embodiments of the faucet assembly, the threshold temperature is 115-125° F.

In some embodiments of the faucet assembly, when the anti-scald device is in the inactive configuration, the SMA spring is fully compressed and the counter spring is fully expanded.

In some embodiments of the faucet assembly, the first shaft portion of the plunger comprises a proximal end adjacent to the cylindrical protrusion portion and a distal end, and when the anti-scald device transitions from the inactive configuration to the fully active configuration, the plunger moves laterally such that an outer surface of the distal end of the first shaft portion of the plunger comes in contact with an interior surface of the hot water inlet.

In some embodiments of the faucet assembly, when the anti-scald device is in the fully active configuration, an outer surface of the cylindrical circumferential portion of the plunger covers an opening of a waterway fluidly connecting the hot water inlet and the mixing chamber, preventing flow of hot water through the opening.

In some embodiments of the faucet assembly, when the anti-scald device transitions from the fully active configuration to the inactive configuration due to the temperature of the mixed water decreasing below the threshold temperature, the counter spring returns to its expanded configuration.

In some embodiments of the faucet assembly, the anti-scald device comprises an outlet configured to receive mixed water from the second cavity, wherein a flow path of the outlet is perpendicular to a direction of lateral movement of the plunger.

In some embodiments of the faucet assembly, an outer diameter of the counter spring is less than an outer diameter of the SMA spring.

In some embodiments of the faucet assembly, the mixing chamber is formed by the housing and a cover plate.

In some embodiments of the faucet assembly, the hot water inlet comprises an adaptor coupled to the housing.

In some embodiments, any one or more of the features, characteristics, or elements discussed above with respect to any of the embodiments may be incorporated into any of the other embodiments mentioned above or described elsewhere herein.

DETAILED DESCRIPTION

Described herein are faucet assemblies including anti-scald devices having a shape memory alloy spring. The shape memory alloy spring of the anti-scald devices is temperature sensitive, such that when the temperature of the mixed water within a faucet assembly reaches or exceeds a threshold temperature, the shape memory alloy spring causes the flow of hot water into the faucet assembly to slow or stop altogether, preventing the temperature of the mixed water to continue to increase. Thus, the anti-scald devices comprising the shape memory alloy spring of the faucet assemblies described herein can prevent scald injuries by automatically adjusting the flow of hot water when necessary (i.e., when the mixed water temperature gets too high).

After activating (i.e., adjusting the flow of hot water in response to a high mixed water temperature), the anti-scald device can reset or return to its original, open position. To reset the anti-scald device, the temperature of the mixed water must decrease below the threshold temperature. This can occur when the hot water flow is restricted, allowing only (or predominantly) cold water to enter the faucet assembly and mixing chamber. When the temperature of the mixed water decreases, the shape memory alloy spring relaxes and returns to its original resting position (i.e., not an expanded position). In some embodiments, a counter spring may provide a force on the shape memory alloy spring, helping to return the shape memory alloy spring to its original, resting position. This original, resting position is also referred to herein as an "open" position, since the hot water inlet waterway is completely open when the shape memory alloy spring is in this position.

In some embodiments, the faucet assemblies described are centerset faucet assemblies, or dual handle faucet assemblies. In some embodiments, the faucet assemblies described are single-handle faucet assemblies. In some embodiments, the faucet assemblies described include widespread (8-inch) dual handle faucets.

In some embodiments, the shape memory alloy spring comprises a copper-aluminum-nickel alloy, a nickel-titanium alloy (nitinol), or an alloy of zinc, copper, gold, and/or iron (such as, for example, Fe—Mn—Si, Cu—Zn—Al, and Cu—Al—Ni). Shape memory alloys maintain a deformed shape when cold and return to their original, or pre-deformed, shape when heated. Thus, the shape memory alloy spring described herein is deformed when in its original, resting, or "open" position. When heated (i.e., by mixed water that reaches or exceeds the threshold temperature), the shape memory alloy spring returns to its pre-deformed shape, which in this case, is an extended spring position.

In some embodiments, the alloy of the shape memory alloy spring comprises nitinol, which is a metal alloy of nickel and titanium. Nitinol has exceptional shape memory and superelasticity properties. Nitinol can deform 10-30 times as much as ordinary metals and still return to its original shape. Whether nitinol behaves with shape memory or super elasticity depends on whether the material is above (superelasticity) or below (shape memory) its transformation temperature.

Referring now to the drawings, like parts are marked throughout the specification and drawings with the same reference numerals, respectively.

Figure 1A:
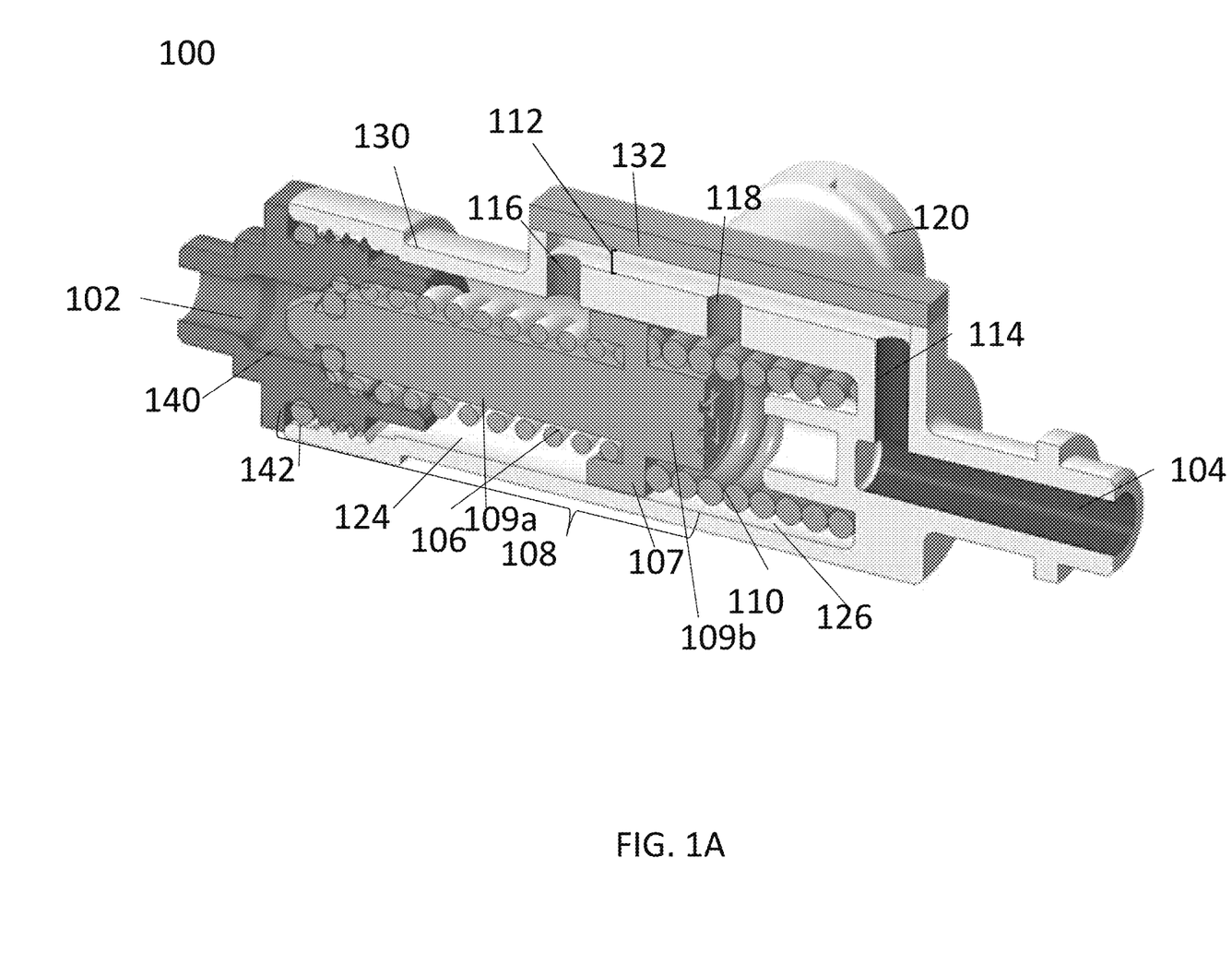
FIG. 1A shows a cross-sectional view of an anti-scald device having a shape memory alloy spring, according to some embodiments.

FIG. 1A shows a cross-sectional view of an anti-scald device 100 having a shape memory alloy spring 110, according to some embodiments. As shown, anti-scald device 100 includes a housing 130, hot water inlet 102, a cold water inlet 104, a shape memory alloy spring 110, a plunger 108, a counter spring 106, a mixing chamber 112, a waterway 116 through which hot water passes from the counter spring cavity (or "first cavity") 124 to the mixing chamber 112, a waterway 114 through which cold water passes from cold water inlet 104 to mixing chamber 112, a waterway 118 through which mixed water passes from mixing chamber 112 to shape memory alloy (SMA) spring cavity 126, and outlet 120, through which water exits the anti-scald device.

Housing 130 comprises a counter spring cavity 124 and a SMA spring cavity 126. Counter spring cavity 124 is configured to house counter spring 106, and SMA spring cavity 126 is configured to house SMA spring 110. Each cavity (i.e., counter spring cavity 106 and SMA spring cavity 126) is defined by interior walls of housing 130 and plunger 108. Further, each cavity (i.e., counter spring cavity 106 and SMA spring cavity 126) is configured to have a variable volume, depending on the activation status of anti-scald device 100. For example, when in an "open" position, SMA spring 110 is in a fully compressed position, such that the hot water inlet flow is entirely unrestricted. In this open position or "inactive configuration", SMA spring cavity 126 is at its minimum volume, and counter spring cavity 124 is at its maximum volume. However, when anti-scald device 100 is activated, the SMA spring 110 expands to push the plunger 108 towards counter spring 106, reducing the volume of counter spring cavity 124 and increasing the volume of SMA spring cavity 126. As shown, counter spring 106 and SMA spring 110 are located on opposing sides of plunger 108. Specifically, counter spring 106 and SMA spring 110 are located on opposing sides of a circumferential protrusion portion 107 of plunger 108. The circumferential protrusion portion of plunger 108 extends from a shaft portion of plunger 108, and an outer surface of circumferential protrusion portion 107 comes in contact with an inner surface of housing 130. Further, when anti-scald device 100 moves between an open (inactive) and a closed (active) position (i.e., when SMA spring expands and returns to its original position in response to a mixed water temperature), the outer surface of circumferential protrusion portion 107 slides against the inner surface of housing 130. When the anti-scald device is in a closed position (i.e., hot water flow is completely restricted), the outer surface of circumferential portion 107 may cover the opening to waterway 116, preventing hot water from flowing to mixing chamber 112. In some embodiments, the outer surface of circumferential protrusion portion 107 creates a watertight seal with the inner surface of housing 130. Counter spring 106 surrounds a first section of shaft portion 109a. Specifically, counter spring 106 surrounds the section of shaft portion 109a that extends into counter spring cavity 124. SMA spring 110 surrounds a second section of shaft portion 109b that extends into SMA spring cavity 126. The first section of shaft portion 109a and the second section of shaft portion 109b are located on opposite sides of circumferential protrusion portion 107.

The first section of shaft portion 109a surrounded by counter spring 106 includes a proximal end located near the circumferential protrusion portion 107 and a distal end extending towards the hot water inlet 102. When anti-scald device 100 is in an open position and hot water flow into the faucet assembly by way of hot water inlet 102 is unrestricted, the distal end of the first section of shaft portion 109a is not in contact with any portion of a wall surface of hot water inlet 102. However, when anti-scald device 100 is in a closed position such that hot water flow into the faucet assembly by way of hot water inlet 102 is completely closed off, an outer circumferential surface of the distal end of the first section of shaft portion 109a is in contact with an inner surface of hot water inlet 102, preventing hot water from passing through.

As shown in FIG. 1A, hot water inlet 102 may be formed with an adapter 140. Adapter 140 may not be formed integrally with housing 130, but may instead be formed separately and then coupled to housing 130. In some embodiments, adapter 140 may comprise a male connector portion that is configured to couple to a female portion of housing 130. In some embodiments, the connector portion of adapter 140 is configured to couple to a connector portion of housing 130 with a threaded coupling. The coupling between housing 130 and adapter 140 may include an o-ring 142 to help ensure a tight seal. In some embodiments, the seal formed between adapter 140 and housing 130 may be watertight.

Anti-scald device 100 is configured to receive hot water at hot water inlet 102. The hot water enters counter spring cavity 124, and then flows to mixing cavity 112 through waterway 116. Anti-scald device 100 is also configured to receive cold water at cold water inlet 104. The cold water enters flows to mixing cavity 112 through waterway 114. Hot water inlet 102 may be configured to couple to a hot water supply (e.g., via a hot water supply hose) and cold water inlet may be configured to couple to a cold water supply (e.g., via a cold water supply hose).

Cold water and hot water mix in mixing chamber 112 to form mixed water. The mixed water flows through waterway 118 into SMA spring cavity 126, where the mixed water comes in contact with SMA spring 110. From SMA spring cavity 126, the mixed water flows to outlet 120. Outlet 120 may be coupled to a faucet body, such that the mixed water can flow from anti-scald device 100, to a faucet body of a faucet assembly, and out of the faucet body to a user.

When the mixed water is in SMA spring cavity 126, it comes in contact with SMA spring 110. If the temperature of the mixed water is at or above a threshold temperature, SMA spring 110 expands to push the plunger 108 towards the hot water inlet 102. As the plunger 108 approaches hot water inlet 102, the hot water flow inlet becomes restricted. If the mixed water temperature is at a temperature that is high enough to cause maximum expansion of the SMA spring 110, the maximum expansion of SMA spring 110 can cause plunger 108 to come in contact with hot water inlet 102, such that inlet water flow through hot water inlet 102 is completely restricted. In this case (i.e., hot water flow is completely restricted), the SMA spring 110 and/or anti-scald device 100 may be in a "closed" position. Additionally, in this position, an outer surface of a distal end of the shaft portion 109a may come in contact with an inner surface of hot water inlet 102, forming a seal. In some embodiments, the seal formed between the outer surface of the distal end of shaft portion 109a and the inner surface of hot water inlet 102 may be a watertight seal. In some embodiments, the inner surface of hot water inlet 102 may include an inner surface of adapter 140 and/or an inner surface of housing 130.

In some embodiments, the interior space of mixing chamber 112 may be defined only by housing 130. In some embodiments, the interior space of mixing chamber 12 may be defined by housing 130 and a cover plate 132. In embodiments comprising a cover plate 132, the cover plate 132 may be manufactured separate from housing 130 and attached to housing 130 to form mixing chamber 112. In some embodiments, housing 130 may comprise a thermoplastic, for example an engineering thermoplastic, for example polyphenylene sulfide. Housing 130 may be injection molded. In some embodiments, cover plate 132 may also comprise a thermoplastic, for example an engineering thermoplastic, for example polyphenylene sulfide. In some embodiments, cover plate 132 may be injection molded or extruded.

In some embodiments, the flow path of an outlet 120 of anti-scald device 100 is perpendicular to a direction of lateral movement of plunger 108. In some embodiments, the flow path of an outlet 120 of anti-scald device 100 is perpendicular to the flow paths of waterways 116, 118, and 114. In some embodiments, the flow paths of waterways 116, 118, and 114 are perpendicular to a direction of lateral movement of plunger 108. In some embodiments, the flow path of an outlet of anti-scald device 100 is un-aligned with the flow paths of waterways 116, 118, and 114 (e.g., not perpendicular or parallel).

Figure 1B:
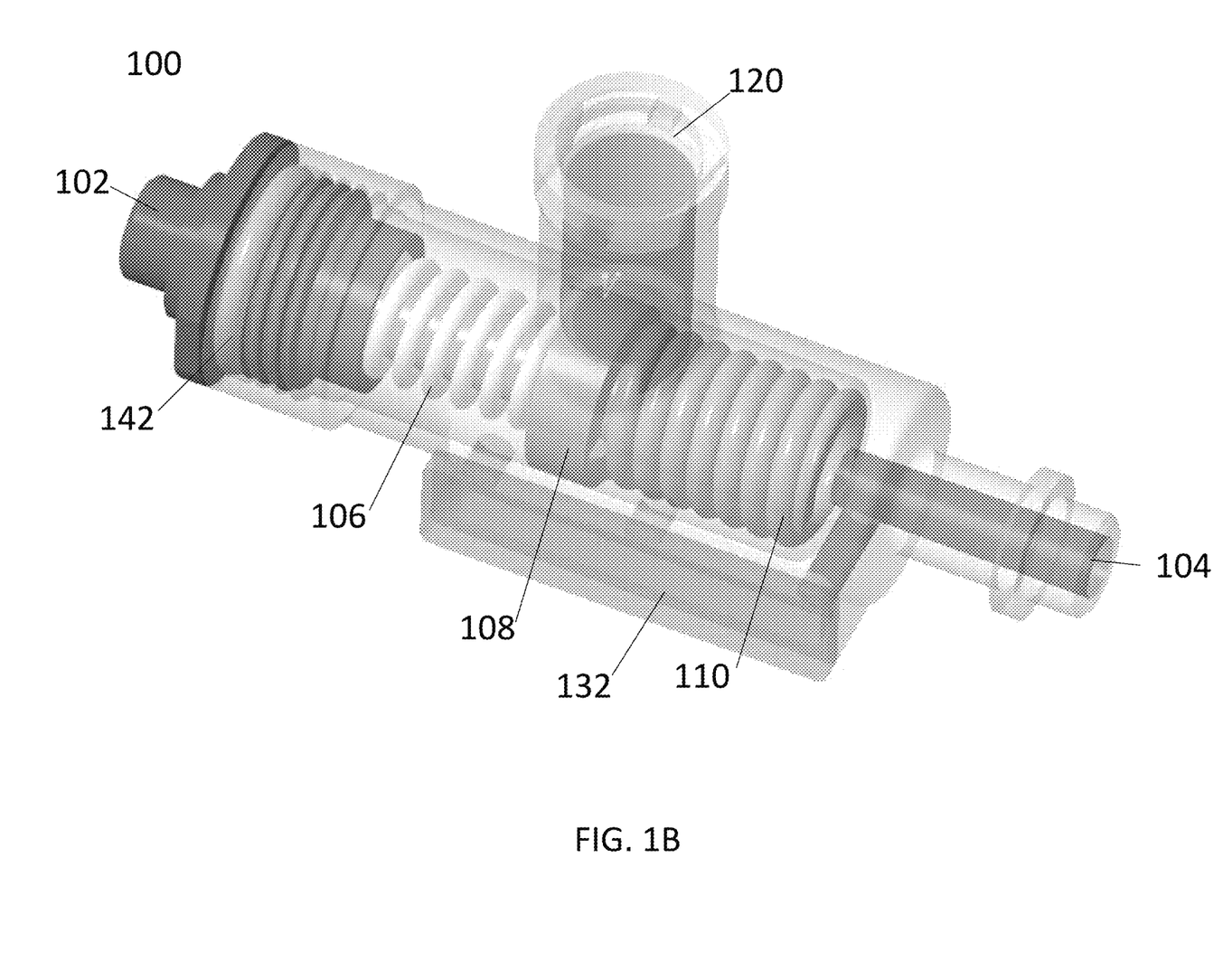
FIG. 1B shows a perspective view of an anti-scald device having a shape memory alloy spring, according to some embodiments.

FIG. 1B shows a perspective view of an anti-scald device 100 having a shape memory alloy (SMA) spring 110, according to some embodiments. Anti-scald device 100 of FIG. 1B shows housing 130, hot water inlet 102, cold water inlet 104, counter spring 106, plunger 108, SMA spring 110, cover plate 132, and outlet 120.

As shown in FIG. 1B, a portion of plunger 108 is not surrounded by either counter spring 106 or SMA spring 110. This portion is a circumferential protrusion portion 107 having an outer circumferential surface that is in contact with an inner surface of housing 130 of anti-scald device 100. The seal formed between the outer circumferential surface of the circumferential protrusion portion 107 of plunger 108 and the inner surface of housing 130 may be a waterproof seal. Further, circumferential protrusion portion 107 divides the inner space of housing 130 into two separate cavities—a counter spring cavity (in which the counter spring 106 is positioned) and an SMA spring cavity (in which the SMA spring 110 is positioned).

The counter spring cavity is configured to receive hot water from hot water inlet 102. The hot water then flows from the counter spring cavity to the mixing chamber. The mixing chamber is also configured to receive cold water from a cold water inlet 104. The hot water and the cold water mix in the mixing chamber to form mixed water. The mixed water then flows from the mixing chamber, to the SMA spring cavity, and out of the anti-scald device 100 via outlet 120.

As explained above, when the mixed water flows from the mixing cavity to the SMA spring cavity, the mixed water comes in contact with the SMA spring 110, which is positioned within the SMA spring cavity. Because the SMA spring is sensitive to heat, it may be activated (i.e., begin to expand) upon contact with mixed water having a temperature at or above a threshold temperature.

In some embodiments, with in an "open" (or compressed, relaxed, original) configuration, SMA spring 110 may have a length of about 12-30 mm. In some embodiments, the SMA spring 110 may have a compressed length of less than or equal to about 30, about 25, about 20, or about 15 mm. In some embodiments, the SMA spring 110 may have a compressed length of greater than or equal to about 12, about 15, about 20, or about 25 mm. Note that when the SMA spring 110 is in an "open" (or compressed, relaxed, original) configuration, the hot water flow is completely unrestricted from hot water inlet 102 to mixing chamber 112, and plunger 108 is in its maximum open position (i.e., positioned as close to cold water inlet 104 as possible).

In some embodiments, when SMA spring 110 expands due to mixed water having a relatively high temperature, SMA spring 110 may have a maximum expanded (or "closed") length of about 15-40 mm. In some embodiments, the SMA spring 110 may have a maximum expanded length of less than or equal to about 40, about 35, about 30, about 25, about 20, or about 15 mm. In some embodiments, the SMA spring 110 may have a maximum expanded length of greater than or equal to about 15, about 20, about 25, about 30, or about 35 mm. Note that when SMA spring 110 is in its maximally expanded (or "closed") position, hot water flow is completely restricted such that is cannot from from hot water inlet 102 to mixing chamber 112, and plunger 108 is in its maximum closed position (i.e., positioned as close to hot water inlet 102 as possible).

SMA spring 110 may comprise a copper-aluminum-nickel alloy, a nickel-titanium alloy (nitinol), or an alloy of zinc, copper, gold, and/or iron (such as, for example, Fe—Mn—Si, Cu—Zn—Al, and Cu—Al—Ni). In some embodiments, SMA spring 110 may comprise nitinol, which is a metal alloy of nickel and titanium. Nitinol has exceptional shape memory and superelasticity properties. Nitinol can deform 10-30 times as much as ordinary metals and still return to its original shape. Whether nitinol behaves with shape memory or super elasticity depends on whether the material is above (superelasticity) or below (shape memory) its transformation temperature.

The thickness of the wire of SMA spring 110 may be about 1.5-3.5 mm. In some embodiments, the wire thickness may be less than or equal to about 3.5, about 3.2, about 3, about 2.8, about 2.5, about 2.2, about 2, or about 1.8 mm. In some embodiments, the thickness of the wire of SMA spring 110 may be greater than or equal to about 1.5, about 1.8, about 2, about 2.2, about 2.5, about 2.8, about 3, or about 3.2 mm.

The outer diameter of SMA spring 110 may be about 8-20 mm. In some embodiments, the outer diameter of SMA spring 110 may be less than or equal to about 20, about 18, about 15, about 12, or about 10 mm. In some embodiments, the outer diameter of SMA spring 110 may be greater than or equal to about 8, about 10, about 12, about 15, or about 18 mm.

As discussed above, the threshold temperature is the temperature at which SMA spring 110 expands to push plunger 108 towards hot water inlet 102 to reduce or completely restrict water flow from hot water inlet 102 to mixing chamber 112. In some embodiments, the threshold temperature is about 100-150 or about 115-125° F. In some embodiments, the threshold temperature may be less than or equal to about 150, about 140, about 130, about 120, or about 110° F. In some embodiments, the threshold temperature may be greater than or equal to about 100, about 110, about 120, about 130, or about 140° F. In some embodiments, the threshold temperature may be less than or equal to about 150, about 140, about 130, about 120, or about 110° F. The threshold temperature may be higher for circumstances in which warmer water is needed and/or the typical user of the faucet assembly is tolerant of hotter water. The threshold temperature may be lower for circumstances in which slightly cooler water is needed and/or the typical user of the faucet assembly is less tolerant of hotter water. In some embodiments, the threshold temperature may be determined by a user. In some embodiments, the threshold temperature may be predetermined by the manufacturer. In some embodiments, the threshold temperature may depend on the material and/or size of the SMA spring 110.

Counter spring 106 is expanded when in its resting position (i.e., water flow from hot water inlet 102 to mixing chamber 112 is completely unrestricted). Counter spring 106 is also fully expanded when SMA spring 110 and/or anti-scald device 100 is in an inactive state (i.e., not restricting any hot water flow). In its fully expanded state, counter spring 106 has a length of about 15-40 mm. In some embodiments, the length of a fully expanded counter spring 106 may be less than or equal to about 40, about 35, about 30, about 25, or about 20 mm. In some embodiments, the length of a fully expanded counter spring 106 may be greater than or equal to about 15, about 20, about 25, about 30, or about 35 mm.

As explained above, when SMA spring 110 and/or anti-scald device 100 is activated (i.e., SMA spring 110 expands to push plunger 108 towards counter spring 106), counter spring 106 is compressed. This also corresponds with the reduction and/or complete restriction of water flow form hot water inlet 102 to mixing chamber 112. Counter spring 106 may have a compressed length of about 10-35 mm. In some embodiments, the compressed length of counter spring 106 may be less than or equal to about 35, about 30, about 25, about 20, or about 15 mm. In some embodiments, the compressed length of counter spring 106 may be greater than or equal to about 10, about 15, about 20, about 25, or about 20 mm.

In some embodiments, the thickness of the wire of counter spring 106 may be about 0.8-3 mm. In some embodiments, the thickness of the wire of counter spring 106 may be less than or equal to about 3, about 2.5, about 2, about 1.5, or about 1 mm. In some embodiments, the thickness of counter spring 106 may be greater than or equal to about 0.8, about 1, about 1.5, about 2, or about 2.5 mm.

The outer diameter of counter spring 106 may be about 5-20 mm. In some embodiments, the outer diameter of counter spring 106 may be less than or equal to about 20, about 15, or about 10 mm. In some embodiments, the outer diameter of counter spring 106 may be greater than or equal to about 5, about 10, or about 15 mm.

Counter spring 106 may comprises stainless steel. In some embodiments, the outer diameter of counter spring 106 may be less than the outer diameter of SMA spring 110. In some embodiments, the thickness of the wire of counter spring 106 may be less than the thickness of the wire of SMA spring 110.

Figure 1C:
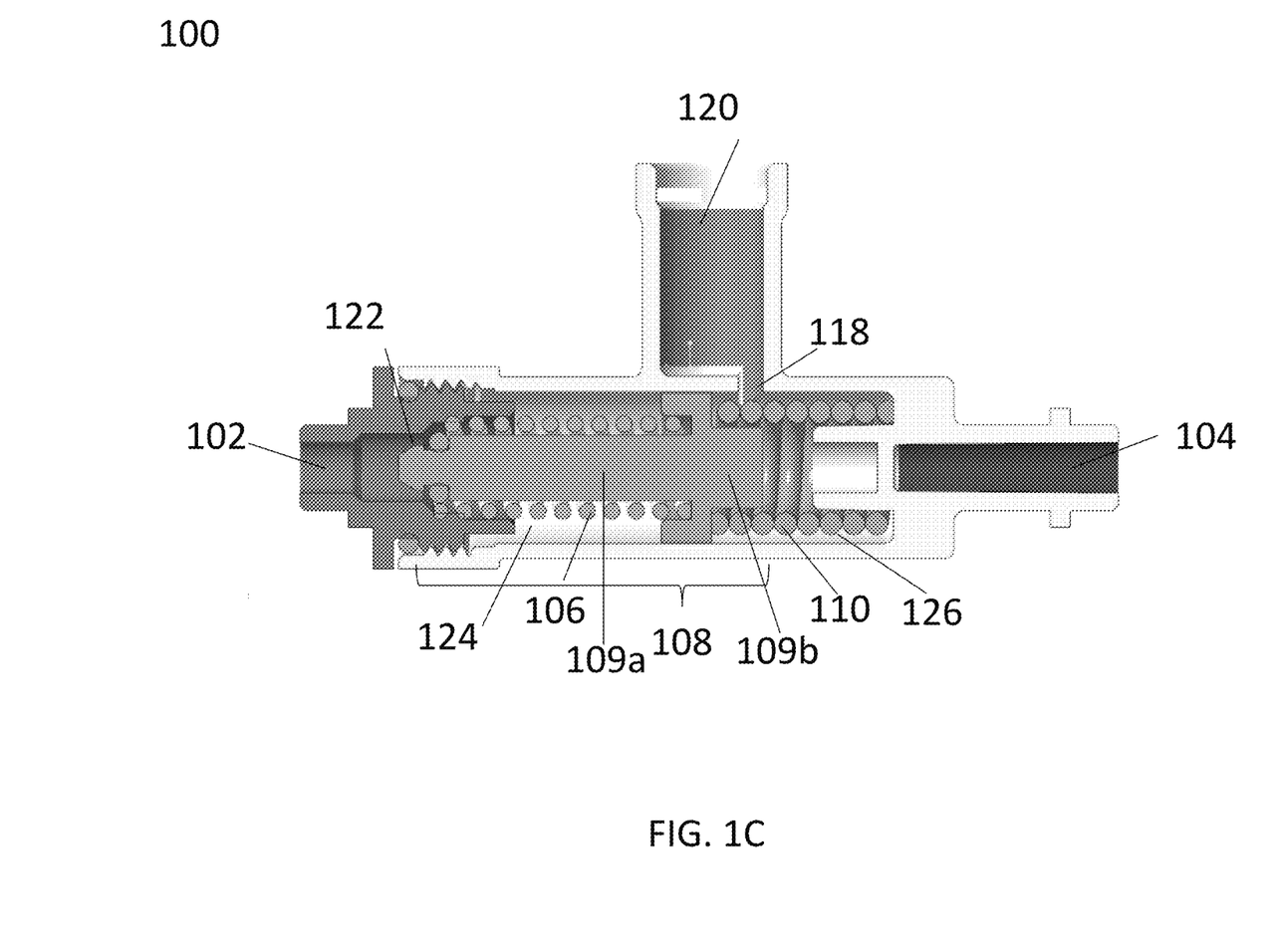
FIG. 1C shows a cross-sectional view of an anti-scald device having a shape memory alloy spring, according to some embodiments.

FIG. 1C shows a cross-sectional view of an anti-scald device 100 having a shape memory alloy (SMA) spring 110, according to some embodiments. As shown, FIG. 1C includes hot water inlet 102, counter spring 106, plunger 108, SMA spring 110, cold water inlet 104, and (mixed water) outlet 120. Further, FIG. 1C shows anti-scald device 100 in an "open" configuration. In this "open" configuration, counter spring 106 is in a maximally expanded position, and SMA spring 110 is in a maximally compressed position. Area 122 is the region at which, when anti-scald device 100 is in its "open" position, will be largest (to allow maximum water flow from hot water inlet 102 to counter spring cavity 124). As plunger 108 slides towards hot water inlet 102 when SMA spring 110 expands in the event the temperature of the mixed water reaches or exceeds the threshold temperature, area 122 will gradually narrow, until the plunger 108 comes in contact with the wall of area 122 (i.e., an interior surface of housing 130 or adapter 140).

FIG. 1C also clearly shows waterway 118 through which mixed water flows from SMA spring cavity (or "second cavity") 126 to outlet 120.

Figure 1D:
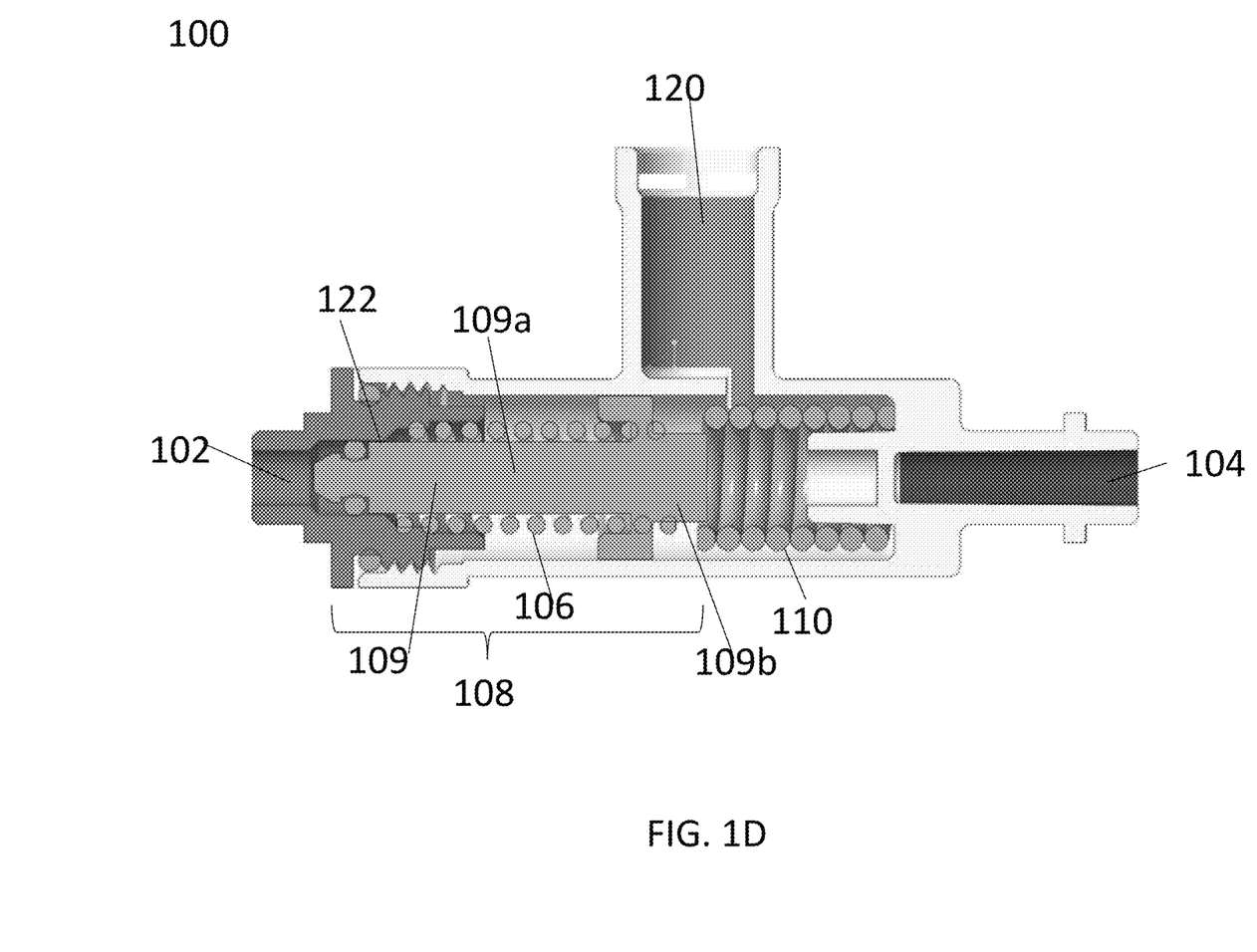
FIG. 1D shows a cross-sectional view of an anti-scald device having a shape memory alloy spring in a closed position, according to some embodiments.

FIG. 1D shows a cross-sectional view of an anti-scald device 100 having a shape memory alloy (SMA) spring 110 in a closed position, according to some embodiments. Here, unlike that which is shown in FIG. 1C, area 122 is completely closed, since plunger 108 is in contact with a surface of hot water inlet 102. In some embodiments, this means that an outer circumferential surface of a distal end of a first portion 109a of plunger 108 comes in contact with an inner surface of hot water inlet 102. The inner surface of hot water inlet 102 may be an inner surface of adapter 140 and/or housing 130.

In some embodiments, when anti-scald device 100 is in a "closed" position, as shown in FIG. 1D, plunger 108 is positioned such that the circumferential protrusion portion 107 of plunger 108 covers an opening of the waterway (e.g., waterway 116 as shown in FIG. 1A) through which hot water might otherwise flow from counter spring cavity 124 to mixing chamber 112. Thus, when anti-scald device 100 is in a "closed" position, SMA spring 110 may push plunger 108 toward hot water inlet 102 such that water flow into counter spring cavity 124 is closed off and water flow from counter spring cavity 214 to mixing chamber 112 is closed off. In some embodiments, an anti-scald device 100 in a "closed" position may close off water flow from hot water inlet 102 into counter spring cavity 124 or water flow from counter spring cavity 124 to mixing chamber 112, but not both.

Figure 1E:
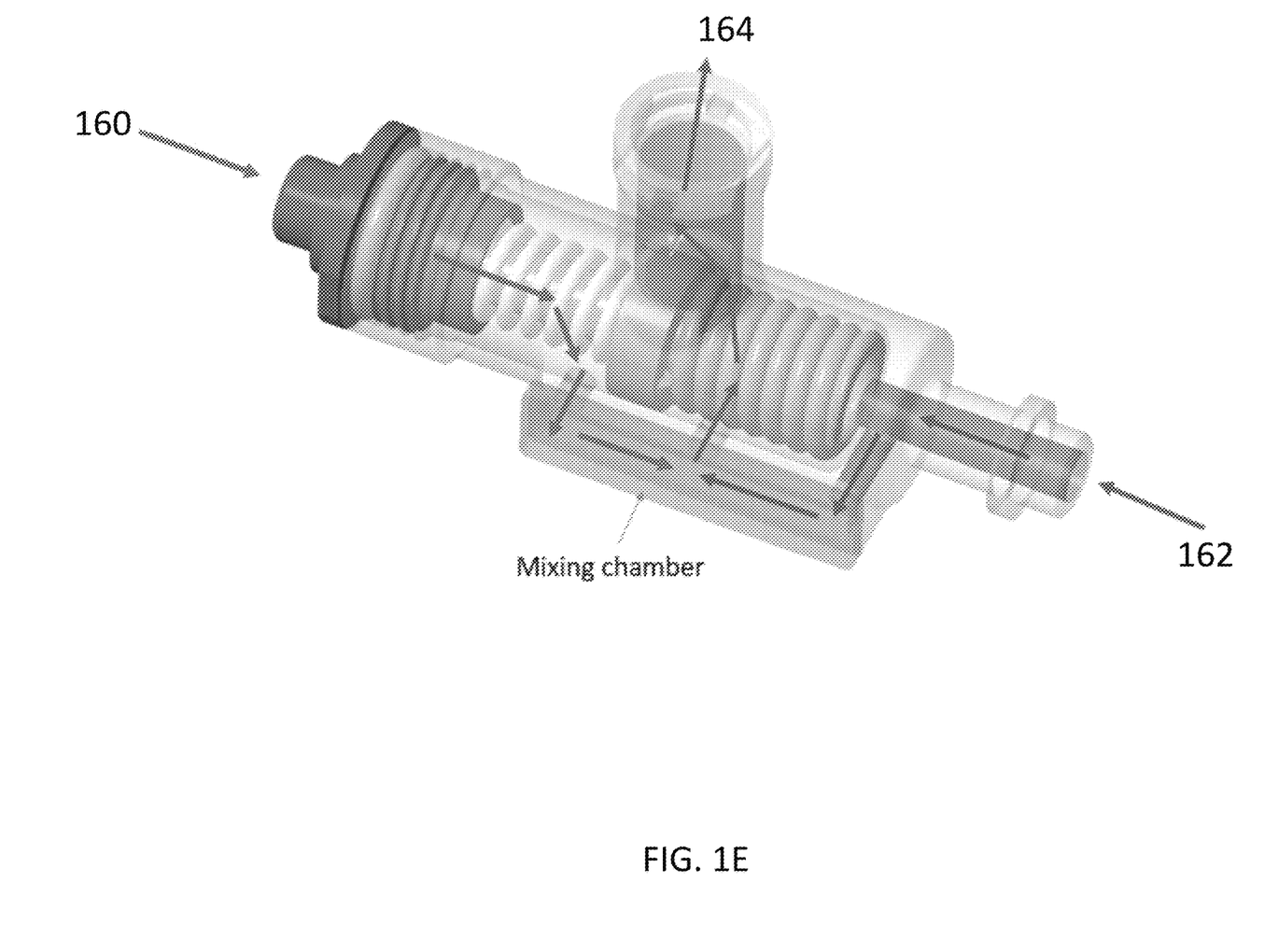
FIG. 1E shows the water flow paths of a perspective view of an anti-scald device having a shape memory alloy spring, according to some embodiments.

FIG. 1E shows the water flow paths of a perspective view of an anti-scald device 100 having a shape memory alloy spring, according to some embodiments. Specifically, the cold water flow path 160, the hot water flow path 162, and the mixed water flow path 164 are shown in FIG. 1E.

Figure 2:
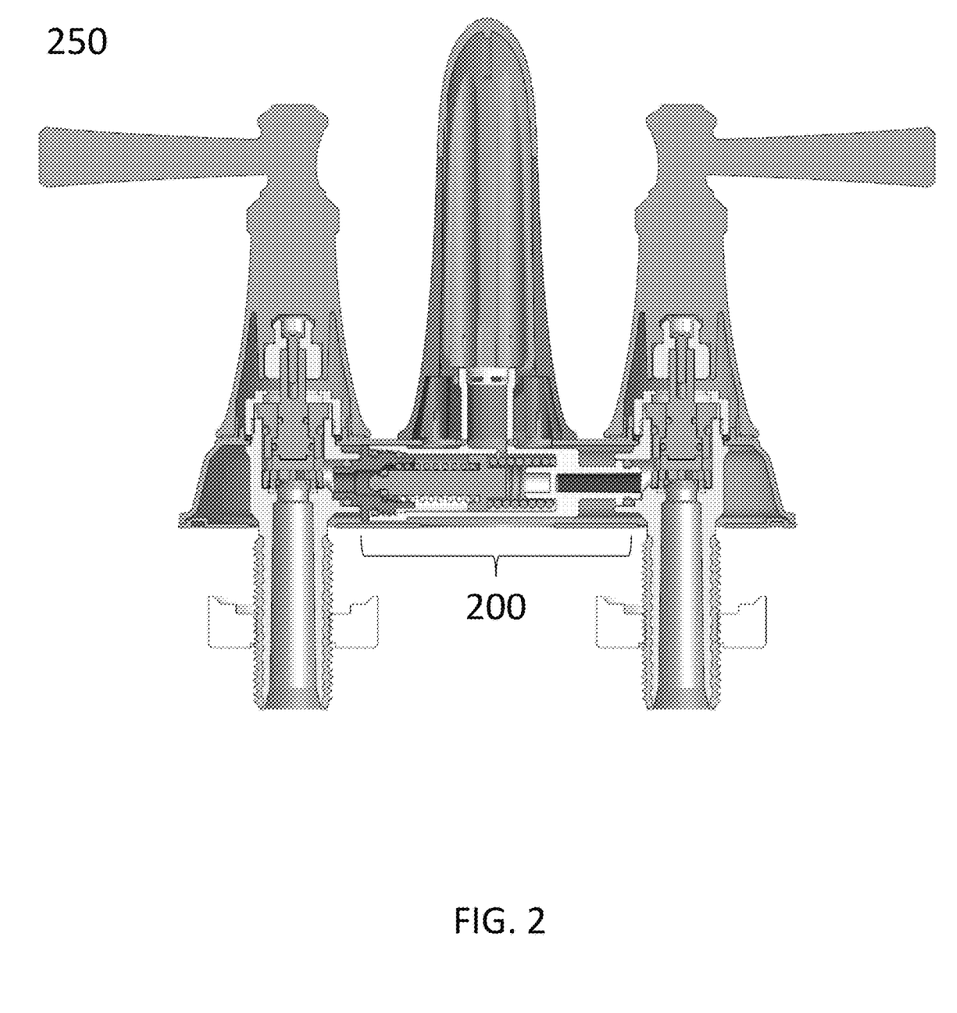
FIG. 2 shows a faucet assembly comprising an anti-scald device, according to some embodiments.
Figure 3:
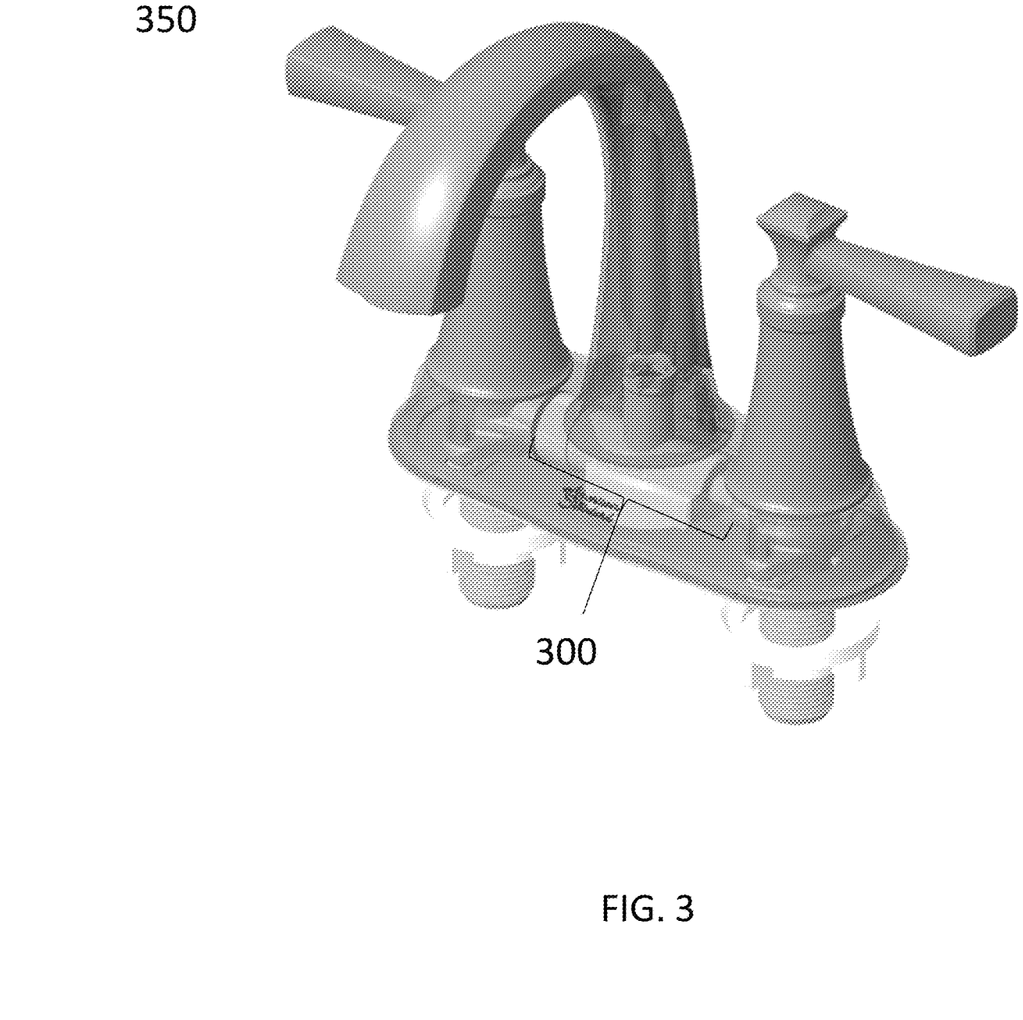
FIG. 3 shows a faucet assembly comprising an anti-scald device, according to some embodiments.

FIG. 2 shows a faucet assembly 250 comprising an anti-scald device 200, according to some embodiments. Similarly, FIG. 3 shows a faucet assembly 350 comprising an anti-scald device 300, according to some embodiments.

The foregoing description sets forth exemplary systems, methods, techniques, parameters, and the like. It should be recognized, however, that such description is not intended as a limitation on the scope of the present disclosure but is instead provided as a description of exemplary embodiments.

Although the description herein uses terms first, second, etc. to describe various elements, these elements should not be limited by the terms. These terms are only used to distinguish one element from another.

The invention claimed is:

1. An anti-scald device for a faucet assembly, the anti-scald device comprising:
a housing having a cylindrical interior space comprising a first cavity, a second cavity, a mixing chamber, a hot water inlet, and a cold water inlet;
a plunger provided within the cylindrical interior space of the housing and comprising a first shaft portion and a circumferential protrusion portion, wherein an outer circumferential surface of the circumferential protrusion portion is in contact with an interior surface of the housing, and the circumferential protrusion portion separates the first cavity from the second cavity of the housing;
a counter spring provided within the first cavity and coiled around the first shaft portion of the plunger; and
a shape memory alloy (SMA) spring provided within the second cavity,
wherein the mixing chamber is configured to receive hot water from the hot water inlet and cold water from the cold water inlet to form mixed water, and the second cavity is configured to receive the mixed water from the mixing chamber, and
wherein the anti-scald device is in an inactive configuration when the temperature of the mixed water is below a threshold temperature, and when the mixed water reaches or exceeds a threshold temperature and comes in contact with the SMA spring, the SMA spring is configured to expand, causing the plunger to move laterally within the housing to compress the counter spring and reduce or restrict hot water flow into the mixing chamber such that the anti-scald device is in a partially active or a fully active configuration.

2. The anti-scald device of claim 1, wherein the SMA spring comprises nitinol.

3. The anti-scald device of claim 1, wherein the threshold temperature is 115-125° F.

4. The anti-scald device of claim 1, wherein, when the anti-scald device is in the inactive configuration, the SMA spring is fully compressed and the counter spring is fully expanded.

5. The anti-scald device of claim 1, wherein the first shaft portion of the plunger comprises a proximal end adjacent to the circumferential protrusion portion and a distal end, and when the anti-scald device transitions from the inactive configuration to the fully active configuration, the plunger moves laterally such that an outer surface of the distal end of the first shaft portion of the plunger comes in contact with an interior surface of the hot water inlet.

6. The anti-scald device of claim 1, wherein, when the anti-scald device is in the fully active configuration, an outer surface of the circumferential protrusion portion of the plunger covers an opening of a waterway fluidly connecting the hot water inlet and the mixing chamber, preventing flow of hot water through the opening.

7. The anti-scald device of claim 1, wherein, when the anti-scald device transitions from the fully active configuration to the inactive configuration due to the temperature of the mixed water decreasing below the threshold temperature, the counter spring returns to its expanded configuration.

8. The anti-scald device of claim 1, wherein the anti-scald device comprises an outlet configured to receive mixed water from the second cavity, wherein a flow path of the outlet is perpendicular to a direction of lateral movement of the plunger.

9. The anti-scald device of claim 1, wherein an outer diameter of the counter spring is less than an outer diameter of the SMA spring.

10. The anti-scald device of claim 1, wherein the mixing chamber is formed by the housing and a cover plate.

11. The anti-scald device of claim 1, wherein the hot water inlet comprises an adaptor coupled to the housing.

12. A faucet assembly comprising an anti-scald device, the faucet assembly comprising:
a faucet body;
two handle members, a first handle member configured to control flow of hot water from a hot water source to the faucet body and a second handle member configured to control flow of cold water from a cold water source to the faucet body; and an anti-scald device fluidly coupled to each of the two handle members and the faucet body, the anti-scald device comprising:
- a housing having a cylindrical interior space comprising a first cavity, a second cavity, a mixing chamber, a hot water inlet in fluid communication with the first handle member, and a cold water inlet in fluid communication with the second handle member;
- a plunger provided within the cylindrical interior space of the housing and comprising a first shaft portion and a circumferential protrusion portion, wherein an outer circumferential surface of the circumferential protrusion portion is in contact with an interior surface of the housing, and the circumferential protrusion portion separates the first cavity from the second cavity of the housing;
- a counter spring provided within the first cavity and coiled around the first shaft portion of the plunger; and
- a shape memory alloy (SMA) spring provided within the second cavity,
- wherein the mixing chamber is configured to receive hot water from the hot water inlet and cold water from the cold water inlet to form mixed water, and the second cavity is configured to receive the mixed water from the mixing chamber, and
- wherein the anti-scald device is in an inactive configuration when the temperature of the mixed water is below a threshold temperature, and when the mixed water reaches or exceeds a threshold temperature and comes in contact with the SMA spring, the SMA spring is configured to expand, causing the plunger to move laterally within the housing to compress the counter spring and reduce or restrict hot water flow into the mixing chamber such that the anti-scald device is in a partially active or a fully active configuration.

13. The faucet assembly of claim 12, wherein the SMA spring comprises nitinol.

14. The faucet assembly of claim 12, wherein the threshold temperature is 115-125° F.

15. The faucet assembly of claim 12, wherein, when the anti-scald device is in the inactive configuration, the SMA spring is fully compressed and the counter spring is fully expanded.

16. The faucet assembly of claim 12, wherein the first shaft portion of the plunger comprises a proximal end adjacent to the circumferential protrusion portion and a distal end, and when the anti-scald device transitions from the inactive configuration to the fully active configuration, the plunger moves laterally such that an outer surface of the distal end of the first shaft portion of the plunger comes in contact with an interior surface of the hot water inlet.

17. The faucet assembly of claim 12, wherein, when the anti-scald device is in the fully active configuration, an outer surface of the circumferential protrusion portion of the plunger covers an opening of a waterway fluidly connecting the hot water inlet and the mixing chamber, preventing flow of hot water through the opening.

18. The faucet assembly of claim 12, wherein, when the anti-scald device transitions from the fully active configuration to the inactive configuration due to the temperature of the mixed water decreasing below the threshold temperature, the counter spring returns to its expanded configuration.

19. The faucet assembly of claim 12, wherein the anti-scald device comprises an outlet configured to receive mixed water from the second cavity, wherein a flow path of the outlet is perpendicular to a direction of lateral movement of the plunger.

20. The faucet assembly of claim 12, wherein an outer diameter of the counter spring is less than an outer diameter of the SMA spring.

* * * * *